(12) United States Patent
Elian

(10) Patent No.: US 9,257,724 B2
(45) Date of Patent: Feb. 9, 2016

(54) REACTION CHAMBER ARRANGEMENT AND A METHOD FOR FORMING A REACTION CHAMBER ARRANGEMENT

(75) Inventor: Klaus Elian, Alteglofsheim (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 971 days.

(21) Appl. No.: 13/336,023

(22) Filed: Dec. 23, 2011

(65) Prior Publication Data

US 2013/0164566 A1    Jun. 27, 2013

(51) Int. Cl.
*H01M 10/42* (2006.01)
*H01M 10/48* (2006.01)

(52) U.S. Cl.
CPC ............. *H01M 10/42* (2013.01); *H01M 10/48* (2013.01); *Y10T 29/49002* (2015.01); *Y10T 29/49826* (2015.01)

(58) Field of Classification Search
CPC .. H01M 10/42; H01M 10/48; H01M 8/04873
See application file for complete search history.

(56) References Cited

U.S. PATENT DOCUMENTS

| | | | |
|---|---|---|---|
| 5,316,871 A * | 5/1994 | Swathirajan et al. ......... | 429/535 |
| 8,410,756 B2 | 4/2013 | Sakakibara et al. | |
| 2002/0102445 A1 * | 8/2002 | Senner ............................ | 429/13 |
| 2003/0027036 A1 | 2/2003 | Emori et al. | |
| 2004/0214079 A1 | 10/2004 | Simburger et al. | |
| 2008/0254344 A1 | 10/2008 | Wang et al. | |
| 2010/0190050 A1 | 7/2010 | Ochi | |
| 2011/0039137 A1 | 2/2011 | Engle et al. | |

FOREIGN PATENT DOCUMENTS

| | | |
|---|---|---|
| AU | 2010257718 B2 | 3/2014 |
| CN | 101789517 A | 7/2010 |
| DE | 102009024657 A1 | 12/2010 |
| DE | 202010012151 U1 | 12/2010 |
| WO | 2004049540 A2 | 6/2004 |

OTHER PUBLICATIONS

Office Action issued in the corresponding German application No. 102012113013.2 dated May 19, 2014.
Office Action received in Chinese Application No. 201210568466.2, mailed on Sep. 3, 2014 (for reference purpose only).

* cited by examiner

*Primary Examiner* — Helen O Conley

(57) ABSTRACT

A reaction chamber arrangement is provided, the reaction chamber arrangement including a first chemical reaction chamber; a second chemical reaction chamber; an isolation member between the first chemical reaction chamber and the second chemical reaction chamber, wherein a first electrode is mounted on a first side of the isolation member, an exposed surface of the first electrode facing into the first chemical reaction chamber and wherein a second electrode is mounted on a second side of the isolation member, an exposed surface of the second electrode facing into the second chemical reaction chamber; and an electronic component configured to measure or control at least one of the first chemical reaction chamber and the second chemical reaction chamber, wherein the electronic component is arranged between and connected to the first electrode and the second electrode, and at least partially surrounded by an isolation material of the isolation member.

26 Claims, 7 Drawing Sheets

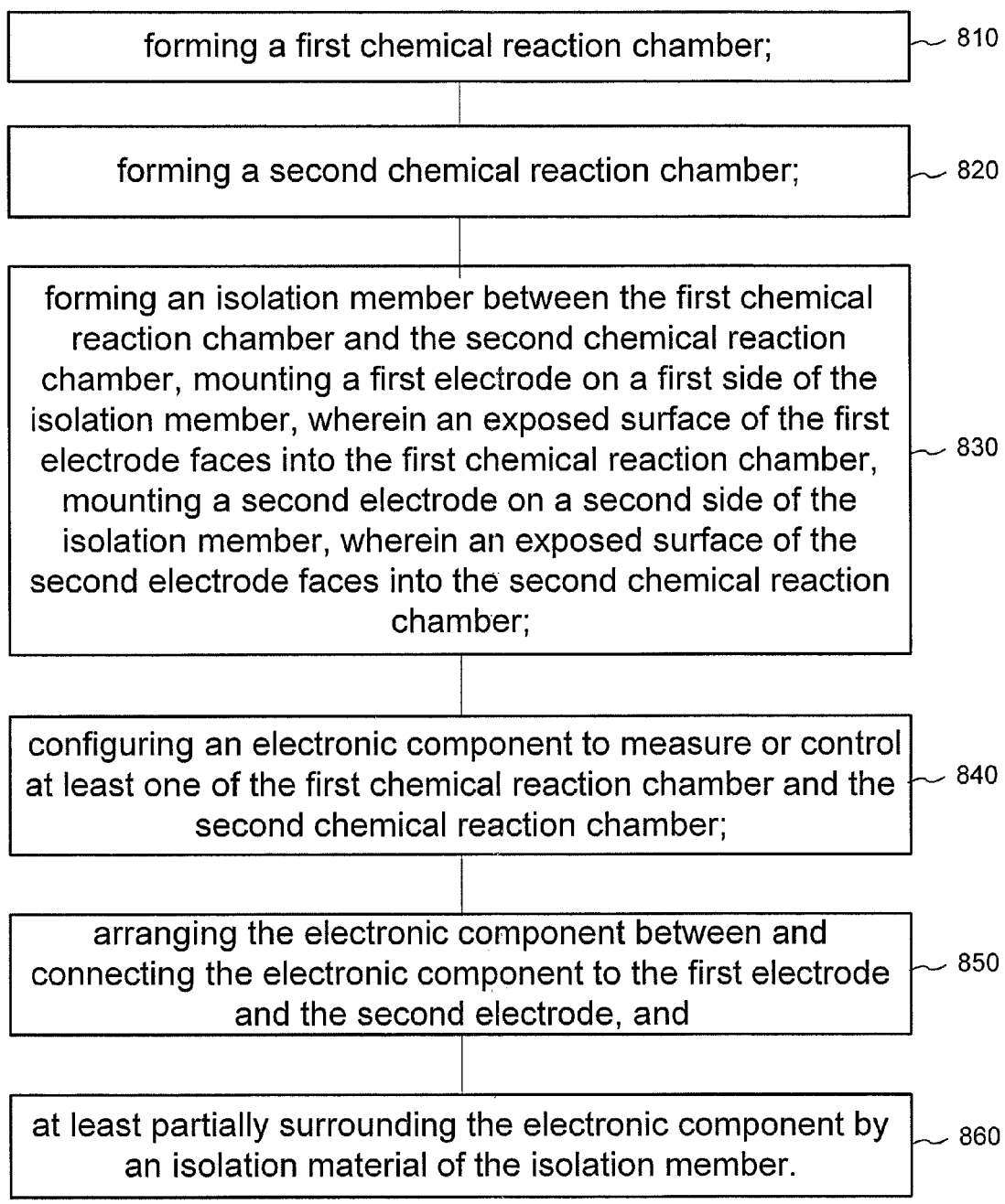

REACTION CHAMBER ARRANGEMENT AND A METHOD FOR FORMING A REACTION CHAMBER ARRANGEMENT

TECHNICAL FIELD

Various embodiments relate generally to a reaction chamber arrangement and a method for forming a reaction chamber arrangement.

BACKGROUND

Currently, circuits, e.g. sensor circuits, e.g. battery circuits, e.g. lead acid batteries, may be monitored or controlled by an electrical circuit, e.g. an external electrical circuit. Most electrical systems may include electronic control units that check the battery status, control the charging process, and generally try to elongate the battery lifetime as long as possible. The monitoring or control units may be spatially separated from the battery. In other words, the electrical circuits may not be integrated within the battery cell, but may instead be situated outside the battery cell, as shown in FIG. 1. For example, batteries, e.g. Li Po batteries which may be used for model building and mobile applications, may currently be controlled by a system in package solution. A battery cell 102 and separate control electronics 104 may be packed together in a package. Current control units 104 may oversee and control the whole battery pack but not individual cells of the battery pack. The current electronic control units may be arranged outside of the battery system, for example, in the case of Li—Po batteries, the control units may be closely packed beside the battery arrangement.

SUMMARY

Various embodiments provide a reaction chamber arrangement, including a first chemical reaction chamber; a second chemical reaction chamber; an isolation member between the first chemical reaction chamber and the second chemical reaction chamber, wherein a first electrode is mounted on a first side of the isolation member, an exposed surface of the first electrode facing into the first chemical reaction chamber and wherein a second electrode is mounted on a second side of the isolation member, an exposed surface of the second electrode facing into the second chemical reaction chamber; and an electronic component configured to measure or control at least one of the first chemical reaction chamber and the second chemical reaction chamber, wherein the electronic component is arranged between and connected to the first electrode and the second electrode, and at least partially surrounded by an isolation material of the isolation member.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 8 shows a method for forming a reaction chamber arrangement according to an embodiment.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over", used herein to describe forming a feature, e.g. a layer, "over" a side or surface, may be used to mean that the feature, e.g. the layer may be formed "directly on", e.g. in direct contact with, the implied side or surface. The word "over", used herein to describe forming a feature, e.g. a layer "over" a side or surface, may be used to mean that the feature, e.g. the layer may be formed "indirectly on" the implied side or surface with one or more additional layers being arranged between the implied side or surface and the formed layer.

Various embodiments provide an arrangement wherein control electronics may be integrated directly into each individual cell of a battery, for example, even directly in the battery electrodes.

Various embodiments provide an arrangement wherein individual cells, e.g. sensor cells, electrochemical cells, chemical cells, battery cells, photovoltaic cells, may be joined using joined electrodes, e.g. joined electrode foils.

Various embodiments provide an integrated electrochemical electrode system within a connected system, wherein one or more integrated circuits may be arranged adjacent to an electrode material, wherein the one or more integrated circuits may be configured to carry out tasks, e.g. sensor tasks, e.g. control tasks.

Various embodiments provide an arrangement wherein control electronics may be integrated directly into each individual cell of a chemical reaction cell, for example, even directly into one or more reaction cell electrodes.

Figure 1:
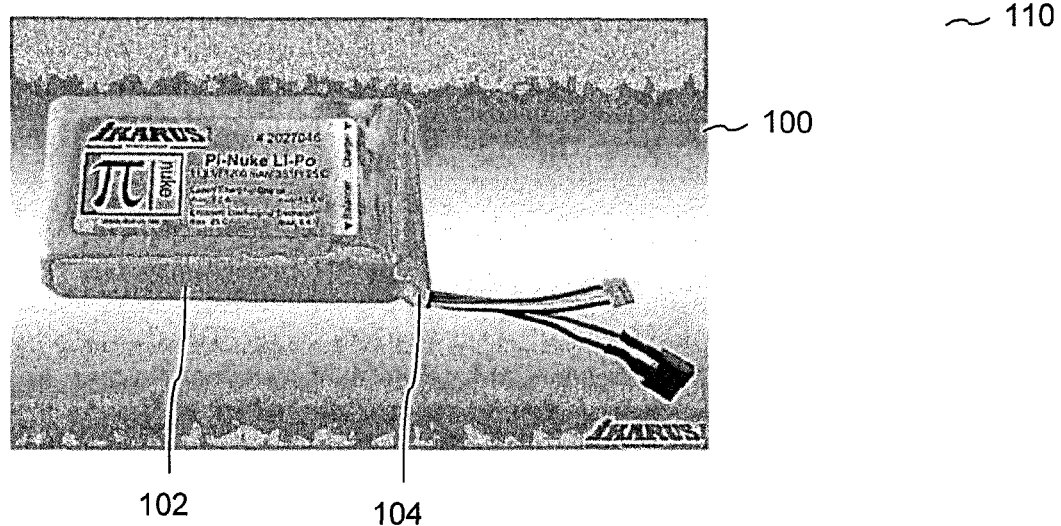
FIG. 1 shows a battery system according to an embodiment.
Figure 2:
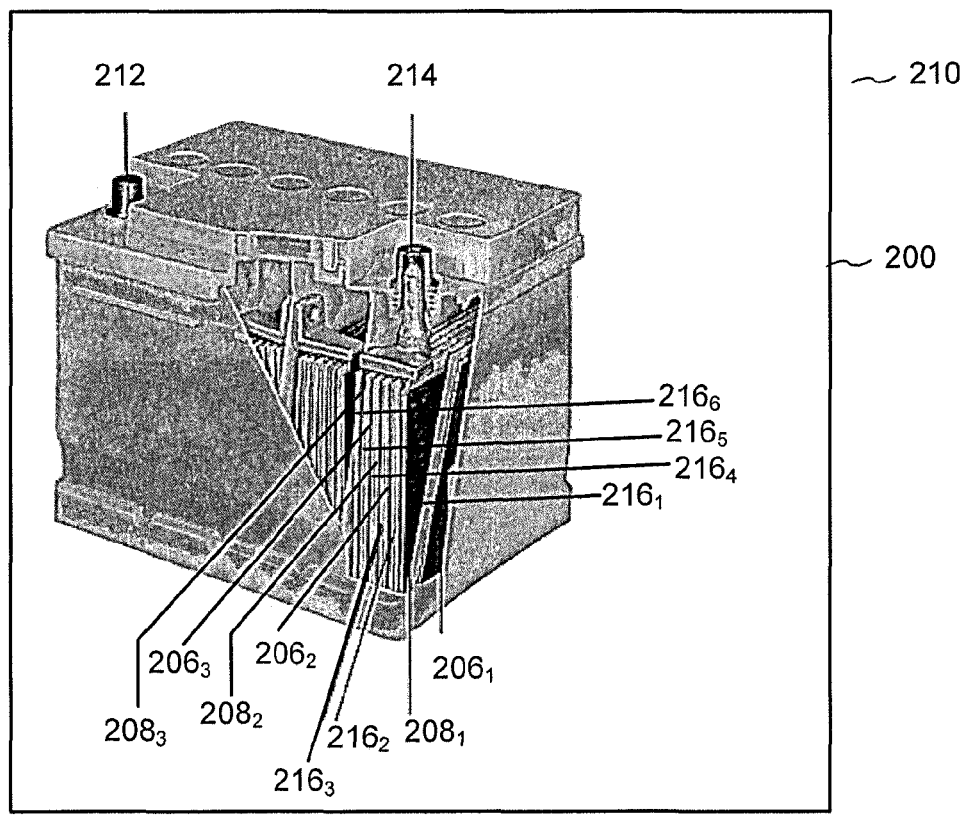
FIG. 2 shows a reaction chamber arrangement according to an embodiment.

FIG. 2 shows a battery system 200 including an arrangement of a plurality of individual battery electrode plates $206_{1,2,3}$, $208_{1,2,3}$. Each of electrode plates $206_{1,2,3}$, $208_{1,2}$, may be in electrical connection with a power source which may be configured to apply a potential difference between electrode plates $206_{1,2,3}$, $208_{1,2,3}$. For example, the power source may be configured to be electrically connected to apply a negative voltage to negative terminal 212 or a positive voltage to positive terminal 214. Each of electrode plates $206_{1,2,3}$, $208_{1,2,3}$ may include either a cathode or an anode. For example, a first electrode plate $206_1$ may include a cathode and a second electrode plate $208_1$ may include an anode. Plurality of individual electrode plates $206_{1,2,3}$, $208_{1,2,3}$, may be arranged, wherein each alternate electrode plate may be connected to a terminal of the same polarity. For example, each alternate second electrode plate $208_{1,2,3}$ may be connected to a positive terminal 214, and each first electrode plate 206$_{1,2,3}$, which may be each be adjacent a second electrode plate 208$_{1,2,3}$, may be connected to a positive terminal 214, may be connected to a negative terminal 212. By way of example, electrode plates 206$_{1,2,3}$, 208$_{1,2,3}$ may be configured to be directly facing each other, wherein the first battery electrode plate 206$_{1,2,3}$ may include a negatively connected plate, i.e. to a minus polarity, and wherein the second battery electrode plate 208$_{1,2,3}$ may include a positively connected plate, i.e. to a plus polarity. A first electrode plate 206$_1$ may be separated from second electrode plate 208$_1$ by an insulating layer, e.g. a separator 216$_1$, between the first electrode plate 206$_1$ and the second electrode plate 208$_1$.

In order for large battery systems to run safely and to have a long lifetime, the processes which occur in the cells, e.g. the individual battery cells, are important: For example, in battery cells, the local temperature effects in individual cells, e.g. single cells, local differences in the concentration of the electrochemical active substances in individual cells, local inhibition effects on single electrodes, and local inhomogeneous current flow in individual cells, e.g. single cells, may affect the way a battery cell functions. The performance of individual cells within a battery system may affect the performance of the entire battery system.

Figure 3A:
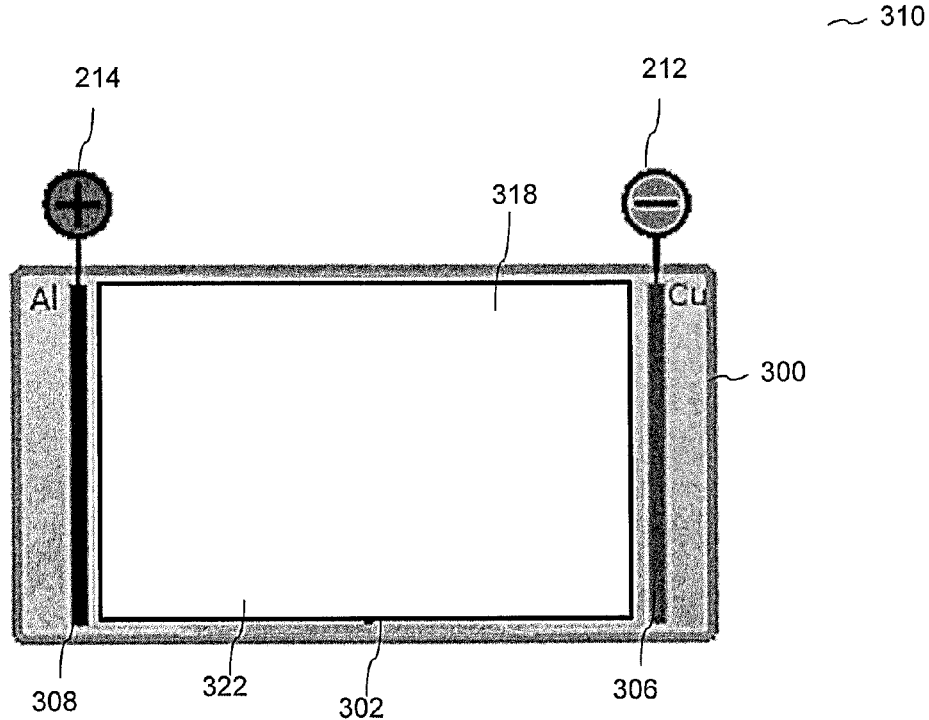
FIG. 3A shows a reaction chamber arrangement according to an embodiment.

FIG. 3A shows a reaction chamber arrangement 300 according to an embodiment, wherein reaction chamber arrangement 300 includes an individual reaction cell 302.

Reaction chamber cell 302 may include first electrode 306; first further electrode 308, and chemical reaction chamber 318 between first electrode 306 and first further electrode 308, wherein chemical reaction chamber 318 may be configured to carry a reaction member 322, e.g. an electrolyte. Chemical reaction chamber 318 may be configured to carry reaction member 322, e.g. an electrolyte (e.g. a liquid electrolyte or a solid state electrolyte). First electrode 306 and first further electrode 308 may be electrically coupled to chemical reaction chamber 318, e.g. first electrode 306 and first further electrode 308 may be chemically and electrically coupled to reaction member 322 carried in chemical reaction chamber 318.

Chemical reaction chamber 318 may be understood to include a region configured to hold the reaction member 322, e.g. an electrolyte, between first electrode 306 and first further electrode 308. Chemical reaction chamber 318 may be understood to include a gap, e.g. a space, between first electrode 306 and first further electrode 308, which may be configured to hold the reaction member 322, e.g. the electrolyte.

Each of first electrode 306 and first further electrode 308 may be configured to carry a flow of charge carriers, e.g. holes or electrons, to or away from reaction member 322 in chemical reaction chamber 318. Each of first electrode 306 and first further electrode 308 may be configured to carry a flow of charge carriers, e.g. holes or electrons, to or away from chemical reaction chamber 318.

According to an embodiment, reaction chamber arrangement 300 may include a photovoltaic cell 302 arrangement, wherein reaction chamber 318 may be configured to carry reaction member 322, e.g. a photovoltaic material (e.g. semiconductor material including a pn junction), configured to generate a flow of charge carriers in at least one of first electrode 306 and first further electrode 308 in response to a photo-induced chemical reaction in the photovoltaic material.

According to various embodiments, reaction chamber arrangement 300 may include a sensor cell 302 arrangement, wherein reaction chamber 318 may include a sensing area configured to generate a flow of charge carriers in at least one of first electrode 306 and first further electrode 308 in response to a signal received by the sensing area. Sensing area may include reaction member 322 which may be include a sensing species configured to generate a flow of charge carriers in at least one of first electrode 306 and first further electrode 308 in response to a stimulus to reaction member 322. Reaction chamber arrangement 300 may include at least one sensor. The at least one sensor may include at least one sensor from at least one from the following group of sensors, the group consisting of: a chemical sensor; a biological sensor; a biochemical sensor; a pressure sensor; and a temperature sensor.

Reaction chamber arrangement 300 may include one or more reaction cells 302. As used heretofore and hereinafter, the term "cell", e.g. a "reaction cell" may be understood to refer to one of a single reaction cell within a reaction chamber arrangement, or one of a plurality of reaction cells in a reaction arrangement. A "cell" 302 may be understood to include a chemical reaction region 318, e.g. a chemical reaction chamber, 318, and at least two terminals, e.g. two electrodes, e.g. a cathode 306 and an anode 308, e.g. an electrode 306 connected to a negative terminal 212 and an electrode 308 connected to a positive terminal 214. The two terminals 306, 308 may be electrically coupled to chemical reaction chamber 318. Chemical reaction chamber 318 may be configured to carry a reaction member 322, e.g. an electrolyte, e.g. a photovoltaic material, e.g. a sensing species. First electrode 306 and first further electrode 308 may be electrically coupled to chemical reaction chamber 318, e.g. first electrode 306 and first further electrode 308 may be electrically coupled to reaction member 322 carried in chemical reaction chamber 318. Each of first electrode 306 and first further electrode 308 may be configured to carry a flow of charge carriers, e.g. holes or electrons, to or away from reaction member 322 in chemical reaction chamber 318. Each of first electrode 306 and first further electrode 308 may be configured to carry a flow of charge carriers, e.g. holes or electrons, to or away from chemical reaction chamber 318. First electrode 306 and first further electrode 308 may be electrically connected to a measurement circuit, wherein the measurement circuit may be configured to quantify the flow of charge carriers, e.g. holes or electrons, to or away from chemical reaction chamber 318. First electrode 306 and first further electrode 308 may be electrically connected to a resistive load, wherein the flow of charge carriers, e.g. holes or electrons, to or away from chemical reaction chamber 318 may be configured to flow through the resistive load.

According to various embodiments, reaction chamber arrangement 300 may include a battery arrangement, wherein reaction chamber 318 may be configured to carry reaction member 322, e.g. an electrolyte, wherein a flow of charge carriers in at least one of first electrode 306 and first further electrode 308 may be generated in response to a movement of ions in electrolyte 322 between first electrode 306 and first further electrode 308.

Figure 3B:
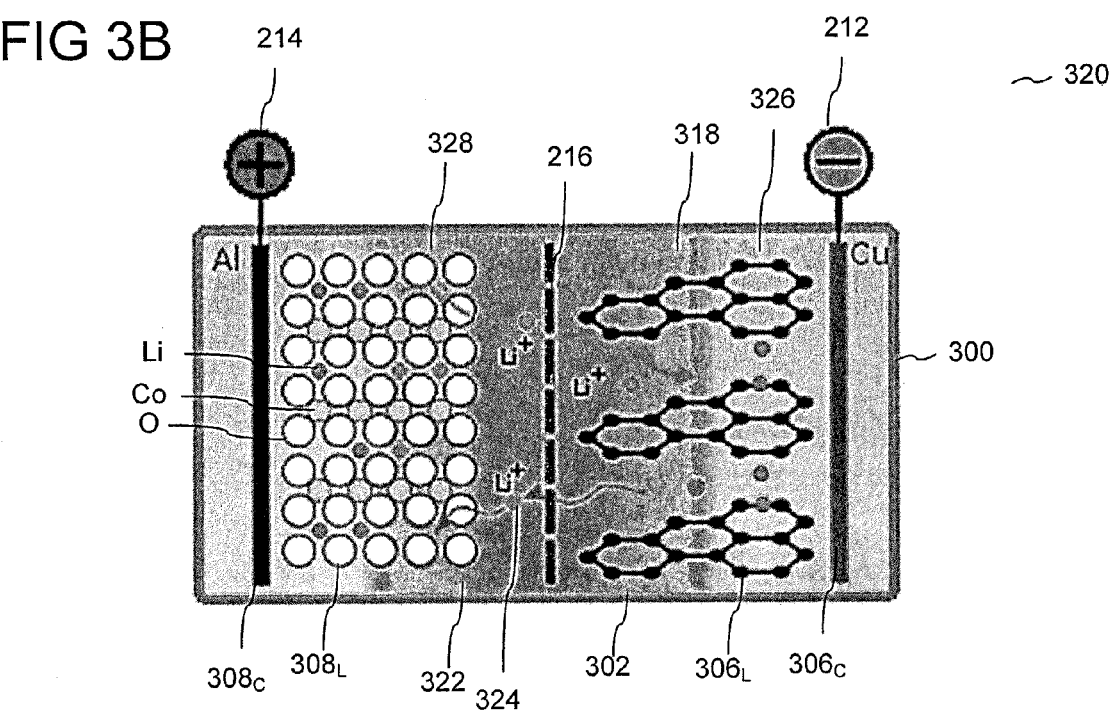
FIG. 3B shows a reaction chamber arrangement according to an embodiment.

FIG. 3B shows battery reaction cell 302 of reaction chamber arrangement 300, wherein battery reaction cell 302 may include a lithium-ion battery cell. Battery reaction cell 302 may include chemical reaction region 318, e.g. a chemical reaction chamber, and at least two terminals, e.g. two electrodes, e.g. a cathode 306 and an anode 308, electrically coupled to chemical reaction chamber 318.

First electrode 306 may include first electrode layer 306$_L$ and first electrode collector 306$_C$. First electrode layer 306$_L$ may be physically coupled to first electrode collector 306$_C$. First electrode layer 306$_L$ may be electrically coupled to first electrode collector 306$_C$. As shown herein, first electrode layer 306$_L$ may include carbon, e.g. graphite. First electrode layer $306_L$ may not be limited to carbon material, but may include a material used in the art to generate electrochemical cells. First electrode layer $306_L$ may include at least one from the following group of material, the group of materials consisting of: organic polymer, a metal, salt, ceramic. For example, first electrode layer $306_L$ may include an electrically active organic polymer. For example, first electrode layer $306_L$ may include a mixture of an organic polymers with at least one of a metal, salt, or ceramic.

First electrode collector $306_C$ may include a foil, e.g. a copper foil. First electrode collector $306_C$ may include a plate, e.g. a copper plate. First electrode collector $306_C$ may include an electrically conductive material. First electrode collector $306_C$ may include at least one material from the following group of materials, the group consisting of a metal, a metal alloy or conducting organic polymers.

First further electrode 308 may include first further electrode layer $308_L$ and first further electrode collector $308_C$. First further electrode layer $308_L$ may be physically coupled to first further electrode collector $308_C$. First further electrode layer $308_L$ may be electrically coupled to first further electrode collector $308_C$. First further electrode layer $308_L$ as shown herein may include but may not be limited to include lithium, e.g. $LiCoO_2$, including lithium, a metal, e.g. cobalt, and oxygen. First further electrode layer $308_L$ may include material used in the art to generate electrochemical cells. First further electrode layer $308_L$ may include at least one from the following group of material, the group of materials consisting of: organic polymer, a metal, salt, ceramic. For example, first electrode layer $306_L$ may include an electrically active organic polymer. For example, first electrode layer $306_L$ may include a mixture of an organic polymers with at least one of a metal, salt, or ceramic. First further electrode collector $308_C$ may include a foil, e.g. an aluminum foil. First further electrode collector $308_C$ may include a plate, e.g. an aluminum plate. First further electrode collector $308_C$ may include an electrically conductive material. First further electrode collector $308_C$ may include at least one material from the following group of materials, the group consisting of a metal, a metal alloy or conducting organic polymers. The chemical reaction chamber 318 may be configured to carry reaction member 322, e.g. an electrolyte. Electrolyte 322 may include an aqueous electrolyte or a non-aqueous electrolyte. Electrolyte 322 may be configured to carry charge carriers, e.g. ions, e.g. lithium ions 324 between first electrode 306 and first further electrode 308 material used in the art to generate electrochemical cells. This may include mixtures of organic polymers with metals, salts, ceramics or other electrically active organic polymers, in aqueous or non-aqueous solutions or gels.

Battery reaction cell 302 may include separator 216, wherein separator 216 may be arranged between first electrode 306 and first further electrode 308. Separator 216 may be configured to electrically isolate first electrode 306 from first further electrode 308 and vice versa. Charge carriers, e.g. ions, e.g. lithium ions may pass through separator 216 during charging and discharging, e.g. charge carriers, e.g. ions, e.g. lithium ions may pass through separator 216 between first sub-region 326 of reaction chamber 318 and second sub-region 328 of reaction chamber 318, during charging and discharging.

Separator 216 may include at least one material from the following group of materials, the group consisting of: ion-selective permeable polymeric foils, ceramic plates or metal foils. Metal foils may be used in specific applications.

First sub-region 326 of reaction chamber 318 may be formed on the same side of separator 216 as first electrode 306. Second sub-region 328 of reaction chamber 318 may be formed on the same side of separator 216 as first further electrode 308.

First electrode layer $306_L$ and first electrode collector $306_C$ may be formed on the same side of separator 216 as first electrode 306. First further electrode layer $308_L$ and first further electrode collector $308_C$ may be formed on the same side of separator 216 as first further electrode 308.

First electrode 306 and first further electrode 308 may be electrically coupled to chemical reaction chamber 318, e.g. first electrode 306 and first further electrode 308 may be electrically coupled to reaction member 322 carried in chemical reaction chamber 318. First electrode layer $308_L$ and first further electrode layer $308_L$ may be electrically coupled to reaction member 322 carried in chemical reaction chamber 318.

During a charging process, a power source may be configured to apply a potential difference between first electrode 306 and first further electrode 308. For example, a negative voltage with respect first further electrode 308 may be applied to first electrode 306. Lithium ions $Li^+$ from first further electrode layer $308_L$ may move from first further electrode 308 to first electrode 306 through separator 216. Lithium ions may intercalate with first electrode layer $306_L$, e.g. with graphite. During this process, electrons may flow in a direction away from first further electrode 308, e.g. away from first further electrode collector $308_C$.

During a discharge process, lithium ions $Li^+$ may move from first electrode 306, e.g. away from first electrode layer $306_L$, towards first further electrode 308, through separator 216. During this process, electrons may flow in a direction towards from first further electrode 308, e.g. towards first further electrode collector $308_C$.

Therefore, each of first electrode 306, e.g. first electrode collector $306_C$ and first further electrode 308, e.g. first further electrode collector $308_C$, may be configured to carry a flow of charge carriers, e.g. holes or electrons, to or away from reaction member 322 in chemical reaction chamber 318. Each of first electrode 306, e.g. first electrode collector $306_C$, and first further electrode 308, e.g. first further electrode collector $308_C$, may be configured to carry a flow of charge carriers, e.g. holes or electrons, to or away from chemical reaction chamber 318.

A reaction chamber arrangement may include a single reaction cell 302. For example, a battery reaction chamber arrangement may include a single battery reaction cell as described with respect to FIG. 3B. Alternatively, a reaction chamber arrangement may include a plurality of reaction cells 302A, 302B etc. For example, a battery reaction chamber arrangement may include a plurality of battery reaction cells 302A, 302B, etc.

Each individual cell, e.g. each individual sensor cell, e.g. individual battery cell, may be connected to another individual sensor cell, e.g. individual battery cell by an electrically conductive wire.

Figure 4:
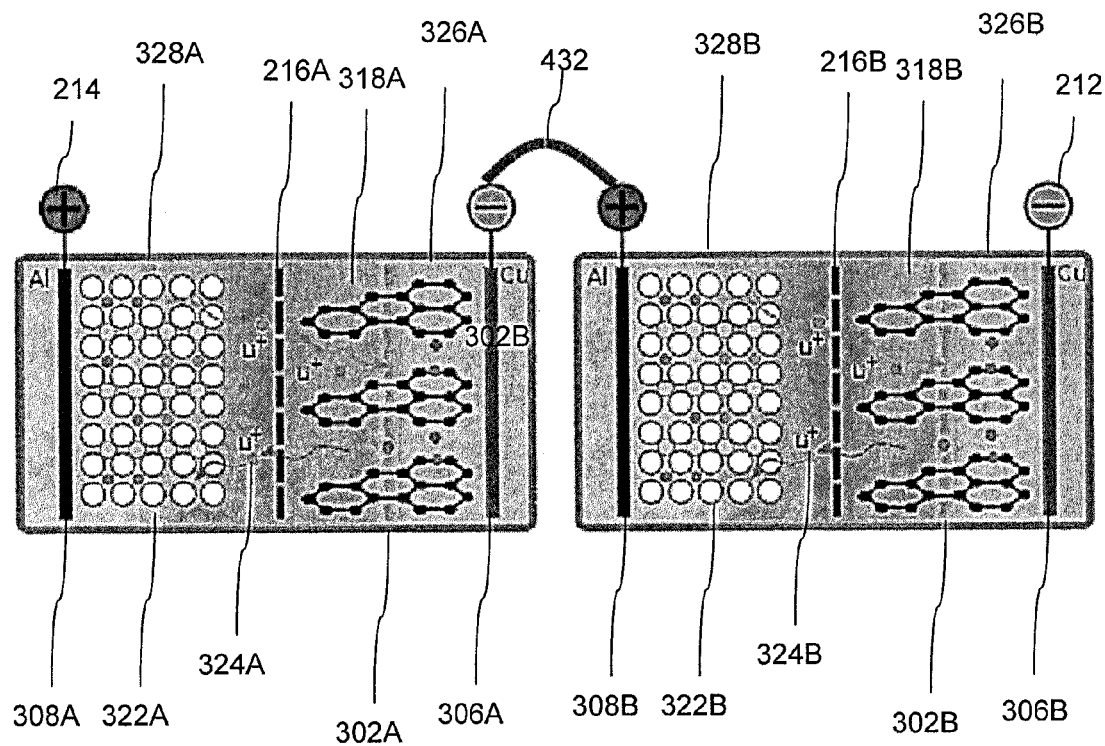
FIG. 4 shows a reaction chamber arrangement according to an embodiment.

FIG. 4 shows a reaction chamber arrangement 400 according to an embodiment. Reaction chamber arrangement 400 may include a two individual battery cells 302A, 302B, which may include all the features and functionalities described above with respect to battery cell 302. First battery cell 302A may be electrically connected to second battery cell 302B by an electrically conductive wire 432 electrically coupled between first electrode 306A of first battery cell 302A and second electrode 308B of second battery cell 302B. Although FIG. 4 shows first electrode 306A of first battery cell 302A and second electrode 308B wherein first electrode 306A of first battery cell 302A may be connected to second electrode 308B of second battery cell 302B, any electrode of first battery cell 302A may be electrically connected to any electrode of second battery cell 302B. For example, first electrode 306A of first battery cell 302A may be electrically connected to first electrode 306B of second battery cell 302B, e.g. in series or in parallel.

The connected electrodes may therefore include the same or different conducting electrode materials. These conducting materials may be at least partly isolated from each other by additional isolating materials between the conducting materials. One or more semiconducting devices may be placed between the conducting electrode materials, wherein the semiconducting devices may be able to measure or to control functions inside the electrode system, e.g. inside the reaction chamber arrangement.

Figure 5:
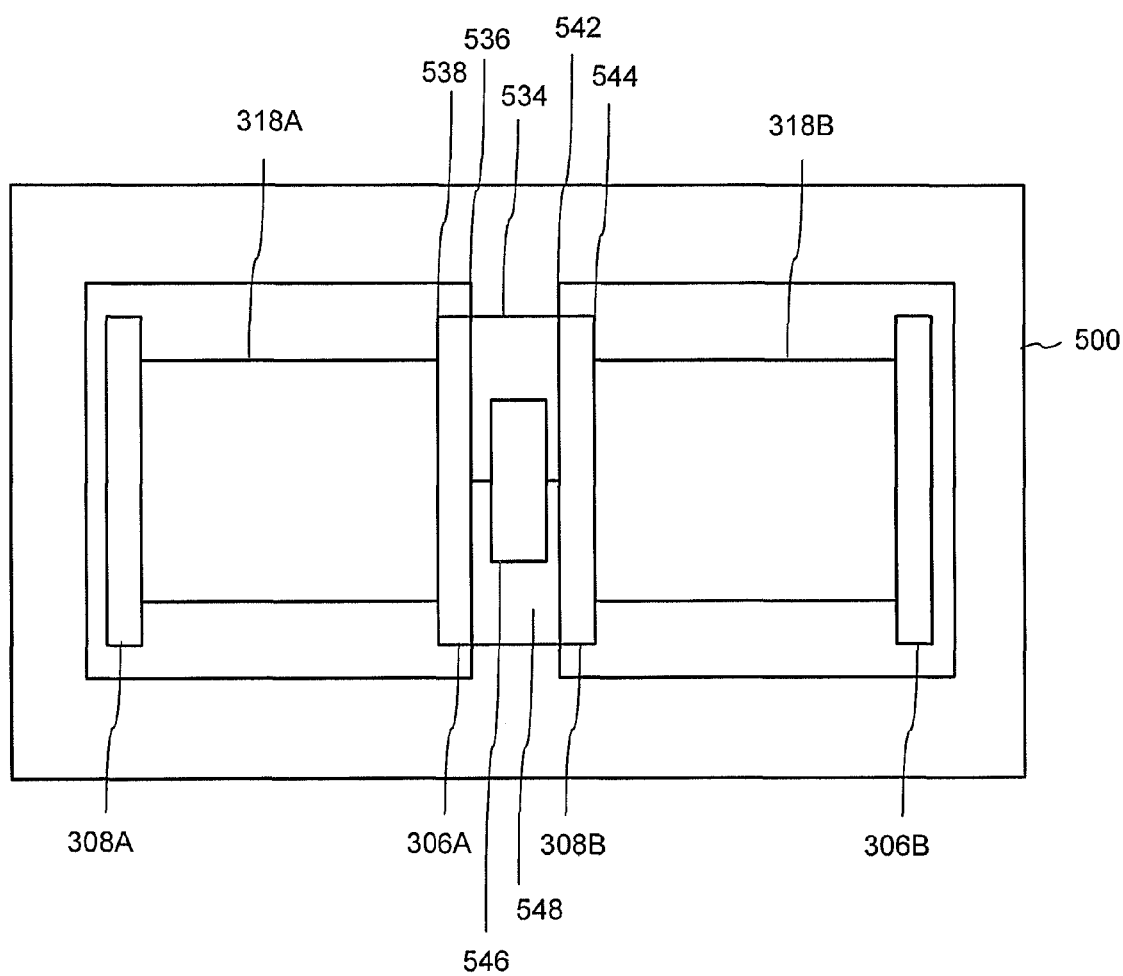
FIG. 5 shows a reaction chamber arrangement according to an embodiment.

FIG. 5 shows reaction chamber arrangement 500 according to an embodiment. Reaction chamber arrangement 500 may include first chemical reaction chamber 318A and second chemical reaction chamber 318B. Isolation member 534 may be arranged between first chemical reaction chamber 318A and second chemical reaction chamber 318B. First electrode 306A may be mounted on first side 536 of isolation member 534. Exposed surface 538 of first electrode 306A may face into first chemical reaction chamber 318A. Second electrode 308B may be mounted on second side 542 of isolation member 534. Exposed surface 544 of second electrode 308B may face into second chemical reaction chamber 318B. Electronic component 546 may be configured to measure or control at least one of first chemical reaction chamber 318A and second chemical reaction chamber 318B. Electronic component 546 may be arranged between and connected to first electrode 306A and second electrode 318B, and at least partially surrounded by isolation material 548 of isolation member 534.

Figure 6A:
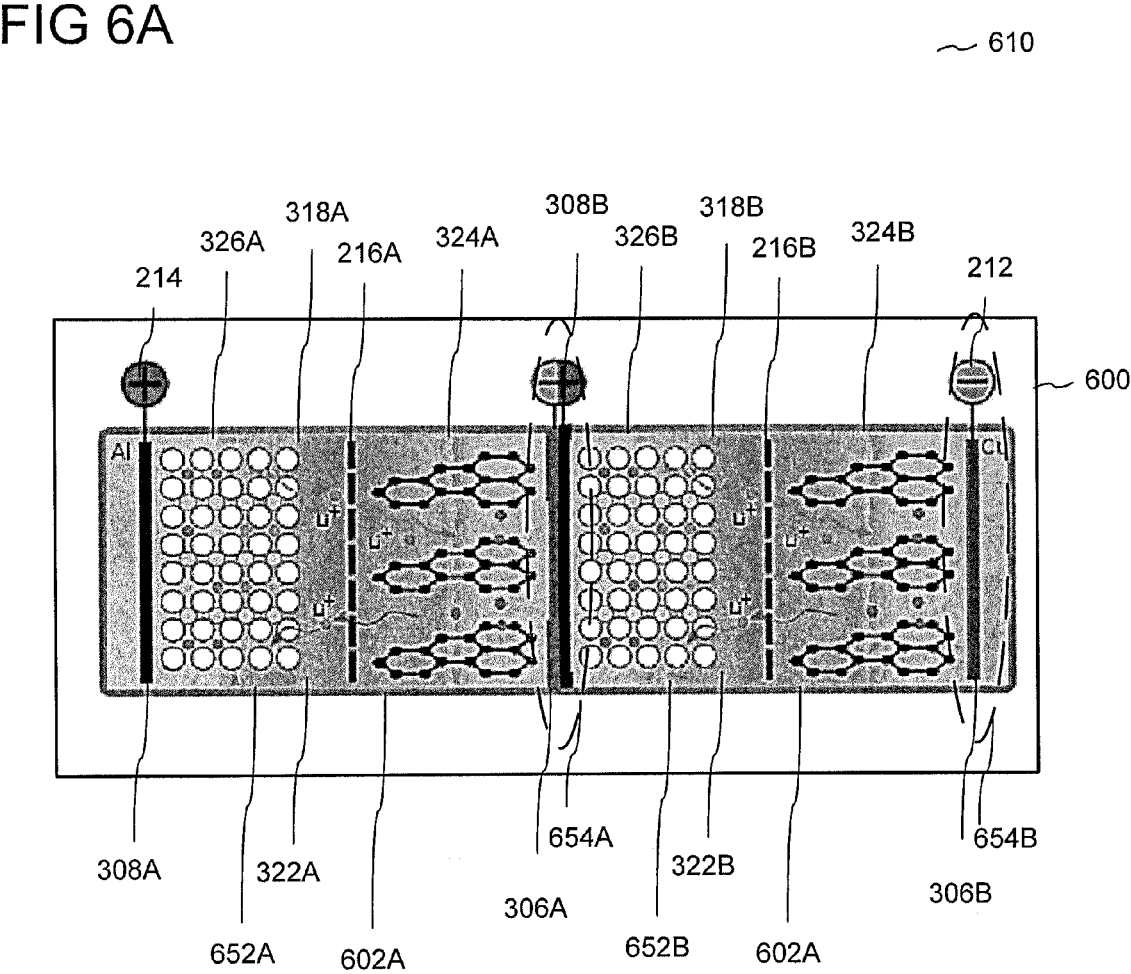
FIGS. 6A and 6B show a reaction chamber arrangement according to an embodiment.
Figure 6B:
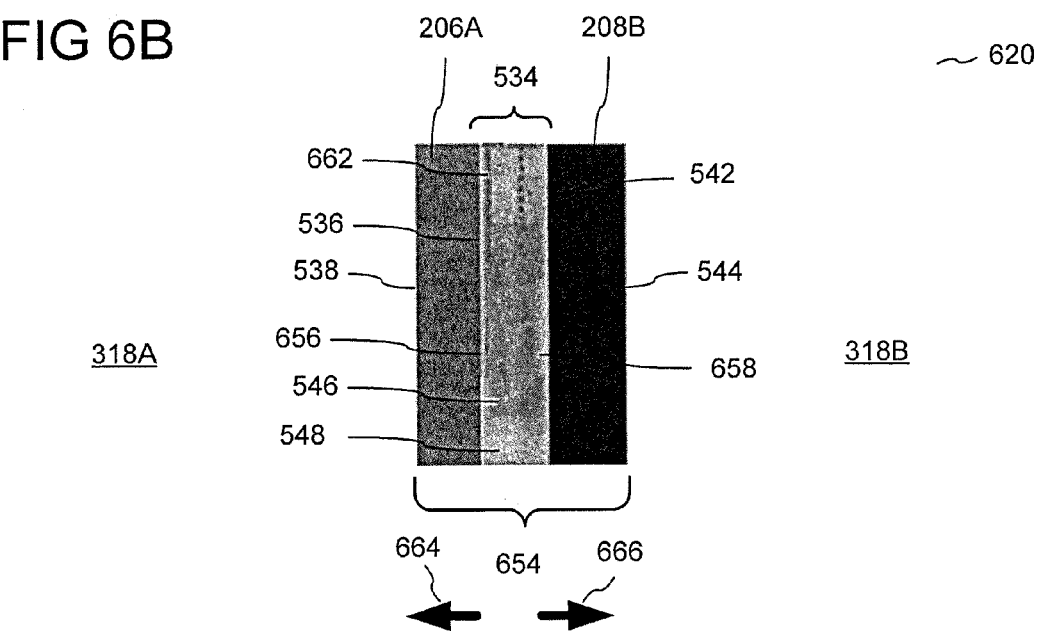

FIGS. 6A and 6B show reaction chamber arrangement 600 according to an embodiment. Reaction chamber arrangement 600 may include all the features described with respect to reaction chamber arrangements 300, 500 described above. Reaction chamber arrangement 600 may include first chemical reaction chamber 318A and second chemical reaction chamber 318B.

Instead of electrically connecting each individual cell, e.g. electrochemical cells, chemical cells, battery cells, photovoltaic cells, using an electrically conductive wire as shown in FIG. 4, electrodes may be adhered, e.g. permanently fixed, to each other using joined electrodes, e.g. joined electrode foils. In other words, the collector portions of electrodes may be substantially joined, e.g. directly joined, to each other. Portion 654A shows joined electrodes of reaction chamber arrangement 600 according to an embodiment. Portion 654A is magnified in FIG. 6B.

Two reaction cells 302A, 302B are shown in the figures, however, the number of reaction cells is not limited to two but may include one or more reaction cells, e.g. three, four, five, six, seven, eight, nine, ten or even more reaction cells such as tens or hundreds of reaction cells.

Isolation member 534 may be arranged between first chemical reaction chamber 318A and second chemical reaction chamber 318B. Isolation member 534 may be arranged between first electrode 306A and second 308B. First electrode 306A may be mounted on first side 536 of isolation member 534, e.g. first electrode collector $306A_C$ may be mounted on first side 536 of isolation member 534.

The term "mounted" may be used herethereto and hereinafter, to mean that first electrode 306A, e.g. first electrode collector $306A_C$, may be formed over first side 536 of isolation member 534. In other words, first electrode 306A, e.g. first electrode collector $306A_C$, may be formed directly on first side 536 of isolation member 534 or first electrode 306A may be formed indirectly on first side 536 of isolation member 534. The term "mounted" may also be used herethereto and hereinafter, to mean that first electrode 306A, e.g. first electrode collector $306A_C$, may be formed over a first surface 536 of isolation member 534. In other words, first electrode 306A, e.g. first electrode collector $306A_C$, may be formed directly on first surface 536 of isolation member 534 or first electrode 306A may be formed indirectly on first surface 536 of isolation member 534. The term "mounted" may also be used herethereto and hereinafter, to mean that first electrode 306A, e.g. first electrode collector $306A_C$, may be in contact, either directly or indirectly with first side 536 of isolation member 534. The term "mounted" may be used herethereto and hereinafter, to mean that a substantial part of first electrode 306A, e.g. first electrode collector $306A_C$, may be joined to first side 536 of isolation member 534.

First electrode 306A, e.g. first electrode collector $306A_C$, may be mounted on first side 536 of isolation material 548 of isolation member 534. The above definition of "mounted" with respect to first electrode 306A and isolation member 534 applies to isolation material 548 of isolation member 534.

An exposed surface 538 of first electrode 306A, e.g. first electrode collector $306A_C$, may face into first chemical reaction chamber 318A. Exposed surface 538 of first electrode 306A may face a direction 664 (in general in a first direction) opposite to a side of first electrode 306A which may be mounted on first side 536 of isolation member 534. Side of first electrode 306A which may be mounted on first side 536 of isolation member 534 may face a direction 666 (in general in a second direction opposite to the first direction).

Second electrode 308B, e.g. second electrode collector $308B_C$, may be mounted on second side 542 of isolation member 534. Second side 542 may be an opposite side to first side 536 of isolation member 534, e.g. second side 542 of isolation member 534 may face direction 666 (in general a second direction opposite to the first direction), and first side 536 of isolation member 534 may face direction 664 (in general the first direction). In other words, second side 542 may face an opposite direction to a direction in which first side 536 faces.

The term "mounted" may be used herethereto and hereinafter, to mean that second electrode 308B, e.g. second electrode collector $308B_C$, may be formed over second side 542 of isolation member 534. In other words, second electrode 308B, e.g. second electrode collector $308B_C$, may be formed directly on second side 542 of isolation member 534 or second electrode 308B may be formed indirectly on second side 542 of isolation member 534. The term "mounted" may also be used herethereto and hereinafter, to mean that second electrode 308B, e.g. second electrode collector $308B_C$, may be formed directly on second surface 542 of isolation member 534. In other words, second electrode 308B, e.g. second electrode collector $308B_C$, may be formed directly on second surface 542 of isolation member 534 or second electrode 308B, e.g. second electrode collector $308B_C$, may be formed indirectly on second surface 542 of isolation member 534. The term "mounted" may also be used herethereto and hereinafter, to mean that second electrode 308B, e.g. second electrode collector $308B_C$, may be in contact, either directly or indirectly with second side 542 of isolation member 534. The term "mounted" may be used herethereto and hereinafter, to mean that a substantial part of second electrode 308B, e.g. second electrode collector $308B_C$, may be joined to second side 542 of isolation member 534.

Second electrode 308A, e.g. second electrode collector $308B_C$, may be mounted on second side 542 of isolation material 548 of isolation member 534. The above definition of "mounted" with respect to second electrode 308A and isolation member 534 applies to isolation material 548 of isolation member 534.

An exposed surface 544 of second electrode 308B may face into second chemical reaction chamber 318B. Exposed surface 544 of second electrode 308B may face a direction 666 opposite to a side of second electrode 308B which may be mounted on second side 542 of isolation member 534. Side of second electrode 308B which may be mounted on second side 542 of isolation member 534 may face a direction 664.

First electrode 306A may form part of first cell 302A. Second electrode 308B may form part of second cell 302B. Each of reaction cells 302A, 302B may include all the features of the reaction cell 302 described with respect to FIGS. 3A and 3B. Cells 302A, 302B may each include a photovoltaic cell as described above. Cells 302A, 302B may each include a battery cell as described above. Cells 302A, 302B may each include a sensor as described above.

Reaction chamber arrangement may include first isolated carrier 652A, e.g. a first plate. Reaction chamber arrangement may include second isolated carrier 652B, e.g. a second plate. First electrode 306A may be formed over first isolated carrier 652A. First chemical reaction chamber 318A may be formed over first isolated carrier 652A. Second electrode 308B may be formed over second isolated carrier 652B. Second chemical reaction chamber 318B may be formed over second isolated carrier 652B. First isolated carrier 652A may be joined to second isolated carrier 652B by means of isolation member 534 joining first electrode 306A and the second electrode 308B.

Each of first chemical reaction chamber 318A and second chemical reaction chamber 318B may include a gap, e.g. a space, which may be configured to hold a reaction member 322, e.g. an electrolyte.

Reaction member 322, e.g. an electrolyte, may at least partially surround first electrode 306A and second electrode 308B. Reaction member 322, e.g. an electrolyte, may at least partially surround first further electrode 308A and second further electrode 306B.

Isolation member 534, e.g. isolation material 548 of isolation member 534, may protect electronic component 546 from reaction member 322, e.g. an electrolyte. Isolation member 534, e.g. isolation material 548 of isolation member 534, may chemically isolate electronic component 546 from reaction member 322, e.g. an electrolyte. Isolation member 534, e.g. isolation material 548 of isolation member 534, may electrically insulate electronic component 546 from reaction member 322, e.g. an electrolyte.

First electrode 306A and second electrode 308B may be electrically coupled through isolation member 534 to allow a charge carrier flow between first electrode 306A and second electrode 308B during a chemical reaction in at least one of first chemical reaction chamber 318A chamber and second chemical reaction chamber 318B, e.g. during a chemical reaction in first chemical reaction chamber 318A chamber and second chemical reaction chamber 318B. First electrode 306A and second electrode 308B may be electrically coupled through isolation member 534 via one or more through-holes in isolation member 534, e.g. via one or more through-holes in isolation material 548 of isolation member 534.

First electrode 306A and second electrode 308B may be electrically coupled via electronic component 546 through isolation member 534 to allow a charge carrier flow between first electrode 306A and second electrode 308B. First electrode 306A and second electrode 308B may be electrically coupled to electronic component 546 via one or more through-holes in isolation member 534, e.g. via one or more through-holes in isolation material 548 of isolation member 534.

Electronic component 546 may be electrically connected to first electrode 306A via first electrical contact 656. First electrical contact 656 may be at least partially surrounded by isolation member 534, e.g. isolation material 548 of isolation member 534. Electronic component 546 may be electrically connected to second electrode 308B via second electrical contact 658. Second electrical contact 658 may be at least partially surrounded by isolation member 534, e.g. isolation material 548 of isolation member 534. Isolation member 534, e.g. isolation material 548 of isolation member 534, may be configured to at least partially surround first electrode 306A and second electrode 308B. First electrode 306A and second electrode 308B may be adhered to isolating member 534. Electronic component 546 may be adhered between first electrode 306A and second electrode 308B in isolating member 534. First electrode 306A may be electrically connected to second electrode 308B through electronic component 546 embedded in isolating member 534.

Isolating member 534, e.g. isolation material 548 may be configured to join first electrode 306A to electronic component 546. Isolating member 534, e.g. isolation material 548 may be configured to join second electrode 306A to electronic component 546.

Electronic component 546 may be configured to measure or control at least one of first chemical reaction chamber 318A and second chemical reaction chamber 318B. Electronic component 546 may be arranged between and connected to first electrode 306A and second electrode 308B, and at least partially surrounded by isolation material 548 of isolation member 534.

First electrode 306A, e.g. first electrode collector $306A_C$, and second electrode 308B, e.g. first electrode collector $308B_C$, may each include at least one from the following group of materials, the group consisting of: Cu, Al, Sn, Zn, Au, Pt, Pd, Ag, Hg, W, Cr, Mn, Pb, C, carbon, metals or metal alloys. Carbon compounds may be used to form first electrode 306A, e.g. first electrode collector $306A_C$, and second electrode 308B, e.g. first electrode collector $308B_C$ without metals. First electrode 306A and second electrode 308B may each include a rigid body, e.g. a metallic plate. First electrode 306A, e.g. first electrode collector $306A_C$, and second electrode 308B, e.g. second electrode collector $308C_C$, may each include a flexible foil.

Isolating member 534, e.g. isolation material 548 of isolation member 534, may include an electrically insulating material. Isolating member 534, e.g. isolation material 548 of isolation member 534, may include at least one from the following group of materials, the group consisting of: an epoxy, a polymer, a laminate, a plastic, a thermoplastic, a foil, a thermoplastic pressed foil. Isolating member 534, e.g. isolation material 548 of isolation member 534, may include a thickness in the range from about 100 μm to about 300 μm.

Electronic component 546 may be configured to control a flow of charge carriers in at least one of first electrode 306A, e.g. first electrode collector $306A_C$, and second electrode 308B, e.g. second electrode collector $308B_C$, to generate a chemical reaction within at least one of first chemical reaction chamber 318A and second chemical reaction chamber 318B.

Electronic component 546 may include an electrical circuit, e.g. a sensor circuit, e.g. a controller circuit, e.g. a controller chip, which may be laminated within, e.g. inside, an electrode stack, e.g. an electrode stack including first electrode 306A, e.g. first electrode collector $306A_C$, and second electrode 308B, e.g. second electrode collector $308B_C$.

Electronic component 546 may be configured as a controller circuit, e.g. an intelligent bypass controller, e.g. an intelligent charge controller.

Electronic component 546 may be configured to provide identification of an individual reaction cell, or a group of reaction cells, e.g. a battery pack.

Electronic component 546 may be configured to determine, local temperature effects in individual cells, local differences in the concentration of the electrochemical active substances in the individual cells, local inhibition effects on individual electrodes, local inhomogeneous current flow in individual cells 302A, 302B.

Electronic component 546 may be configured to prevent misusage of each reaction cell, e.g. in sensor cells if the sensor arrangement may be connected to non-ideal electrical environments.

Direct measurements may be taken directly from a reaction cell 302A, 302B interior, e.g. in the interior of each battery cell 302A, 302B. For example, temperature, current flow may be measured via hall sensor cells, galvanic potential.

Electronic component 546 may be configured to control individual cells, or individual cell areas from large car batteries, with separate intelligence. If large electrode layers are used, different areas of this large electrode can be controlled differently, e.g. by distributing several controller ICs inside the large electrodes, e.g. between the electrodes, thereby allowing an area selective controlling mechanism of different electrode areas.

Electronic component 546 may be configured to measure or control one or more signals associated with a flow of charge carriers between first electrode 306A and second electrode 308B.

Electronic component 546 may be configured to measure or control at least one signal from the following group of signals of at least one of first chemical reaction chamber 318A and second chemical reaction chamber 318B, the group of signals consisting of: current flow, charge concentration, charge homogeneity, current homogeneity, voltage, temperature.

Electronic component 546 may be configured to measure or control at least one of first chemical reaction chamber 318A and second chemical reaction chamber 318B. Electronic component 546 may be arranged between and connected to first electrode 306A, e.g. first electrode collector 306A$_C$, and second electrode 308B, e.g. second electrode collector 308B$_C$, and at least partially surrounded by isolation material 548 of isolation member 534. Electronic component 546 may be configured to measure or control at least one of first chemical reaction chamber 318A and second chemical reaction chamber 318B by monitoring at least one of first electrode 306A, e.g. first electrode collector 306A$_C$, and second electrode 308B, e.g. second electrode collector 308B$_C$.

Electronic component 546 may be configured to identify at least one of first chemical reaction chamber 318A and second chemical reaction chamber 318B.

Electronic component 546 may be configured to measure or control first chemical reaction chamber 318A independently from second chemical reaction chamber 318B.

Electronic component 546 may be configured to provide feedback between first chemical reaction chamber 318A and second chemical reaction chamber 318B, wherein behavior of first chemical reaction chamber 318A and second chemical reaction chamber 318B may interdependent.

Electronic component 546 may be configured to measure one or more parameters inside the reaction chambers, e.g. inside the battery, such as temperature, pressure, current, potential. Electronic component 546 may be further configured as a controller circuit. Electronic component 546 may be configured to control current between the two electrode plates, e.g. with help of power transistors. The current flow can be controlled by external or internal trigger or control mechanisms. Also the current flow outside the electrode to the electric surrounding can be controlled.

Electronic component 546 may be configured to include an electronic identification mechanism which allows the battery to be identified as a unique device.

Electronic component 546 may include one or more input/output connections 662. For example, one or more input signals may be received by electronic component 546 via input/output connection 662. The one or more input signals may include measurement signals obtained from at least one of first chemical reaction chamber 318A and second chemical reaction chamber 318B.

One or more output signals may be transmitted by electronic component 546 by via input/output connection 662. Electronic component 546 may be electrically connected to one or more other microcontrollers. For example, electronic component 546A embedded between first electrode 308A, e.g. first electrode collector 306A$_C$, and second electrode 308B, e.g. second electrode collector 308B$_C$, may be electrically connected with further electronic component 546B embedded between second further electrode 306B, e.g. second further electrode collector 306B$_C$, and a third electrode collector 308C$_C$. In other words, electronic component 546 which may be configured to monitor or control a predetermined group of reaction cells may be electrically connected with further electronic component 546B which may be configured to monitor or control a further predetermined group of reaction cells, wherein the predetermined group of reaction cells and the further predetermined group of reaction cells form part of reaction chamber arrangement 600. Furthermore, further predetermined group of reaction cells may not be monitored or controlled by electronic component 546A, and predetermined group of reaction cells may not be monitored or controlled by electronic component 546B.

Reaction chamber arrangement 600, according to various embodiments, may include a single reaction cell 302. For example, reaction chamber arrangement 600 may include a single reaction cell as described with respect to FIGS. 3A and 3B, such as a single reaction cell 302A. Alternatively, reaction chamber arrangement 600 may include a plurality of reaction cells 302A, 302B, 302C etc. For example, a battery reaction chamber arrangement may include a plurality of battery reaction cells 302A, 302B, 302C, 302D etc. According to various embodiments, reaction chamber arrangement 600 may include one or more reaction cells, e.g. one, two, three, four, five, six, seven, eight, nine, ten or even more reaction cells such as tens or hundreds of reaction cells.

Each individual cell 302A, e.g. each individual sensor cell, e.g. individual battery cell, may be connected to another individual cell 302B, e.g. another individual sensor cell, e.g. individual battery cell. The individual cells 302A, 302B, 302C may be electrically connected in parallel, or in series, or partly in parallel and partly in series.

Reaction chamber arrangement 600 may further include first further electrode 308A. As described above with respect to an individual reaction cell, first chemical reaction chamber 318A may be electrically coupled between first electrode 306A and first further electrode 308A, e.g. reaction chamber 318A may be electrically coupled between first electrode collector 306A$_C$ and first further electrode collector 308A$_C$. First chemical reaction chamber 318A, first electrode 306A and first further electrode 308A may form part of a first reaction cell 302A. An exposed surface of first further electrode 308A may face into first chemical reaction chamber.

Reaction chamber arrangement 600 may further include second further electrode 306B, wherein second chemical reaction chamber 318B may be electrically coupled between second electrode 308B and second further electrode 306B, e.g. reaction chamber 318B may be electrically coupled between second electrode collector 308B$_C$ and second further electrode collector 306B$_C$. An exposed surface of second further electrode 306B may face into second chemical reaction chamber 318B. Second further electrode 306B may be mounted on a first side of further isolation member 534B. Therefore, an exposed surface of second further electrode 306B may face into second chemical reaction chamber 318B.

Reaction chamber arrangement 600 may further include third reaction cell 302C. Reaction chamber arrangement 600 may further include third chemical reaction chamber 318C; a further isolation member 534B between second chemical reaction chamber 318B and third chemical reaction chamber 318C. Second further electrode 306B may be mounted on a first side of further isolation member 534B. Therefore, an exposed surface of second further electrode 306B may face into second chemical reaction chamber 318B. Third electrode 308C may be mounted on a second side of further isolation member 534B. An exposed surface of third electrode 308C may face third chemical reaction chamber 518C. Further electronic component 546B may be configured to measure or control at least one of second chemical reaction chamber 518B and third chemical reaction chamber 518C. Electronic component 546B may be arranged between and connected to second further electrode 306B and third electrode 308C, and at least partially surrounded by a further isolation material 548 of further isolation member 534B.

When electrically connected in series, first electrode 306A may be joined to second electrode 308B, e.g. first electrode collector 306A$_C$ may be joined via isolation member 534 to second electrode collector 308B$_C$ as described above with respect to various embodiments. Further first electrode 308A may be electrically connected, e.g. directly connected, to a second terminal 214, e.g. a positive terminal, of a power supply. Second further electrode 306B, may be electrically connected, e.g. directly connected, to a first terminal 212, e.g. a negative terminal, of the power supply.

When electrically connected in parallel, first electrode 306A and second further electrode 306B may be electrically connected, e.g. directly connected, to a first terminal 212, e.g. a negative terminal, of the power supply. Second electrode 308B and further first electrode 308A may be electrically connected, e.g. directly connected, to a second terminal 214, e.g. a positive terminal, of a power supply.

First electrode 306A and second further electrode 306B may be joined as described with respect to various embodiments above, describing how first electrode 306A, e.g. first electrode collector 306A$_C$, and second electrode 308B, e.g. second electrode collector 308B$_C$ may be joined. Second electrode 308B and further first electrode 308A may be joined as described with respect to various embodiments above, describing how first electrode 306A, e.g. first electrode collector 306A$_C$, and second electrode 308B, e.g. second electrode collector 308B$_C$ may be joined.

According to various embodiments, when electrically connected in series, first electrode 306A, e.g. second electrode collector 308B$_C$, may be joined to second electrode 308B, e.g. second electrode collector 308B$_C$, as described above with respect to various embodiments. Second further electrode 306B, e.g. second further electrode collector 306B$_C$, may be joined to third electrode 308C, e.g. third electrode collector 308C$_C$ as described above with respect to various embodiments, and so forth. Further first electrode 308A may be electrically connected, e.g. directly connected, to a second terminal 214, e.g. a positive terminal, of a power supply. Third further electrode 306C, wherein third chemical reaction chamber 318C, third electrode 306C and third further electrode 308C may form part of a first reaction cell 302C, may be electrically connected, e.g. directly connected, to a first terminal 212, e.g. a negative terminal, of the power supply.

When electrically connected in parallel, first electrode 306A, second further electrode 306B and third further electrode 306C may be electrically connected, e.g. directly connected, to first terminal 212, e.g. a negative terminal, of the power supply. Second electrode 308B, further first electrode 308A and third electrode 308C may be electrically connected, e.g. directly connected, to second terminal 214, e.g. a positive terminal, of the power supply.

Second further electrode 306B, e.g. second further electrode collector 306B$_C$, and third further electrode 306C, e.g. third further electrode collector 306C$_C$, may be joined as described with respect to various embodiments above, describing how first electrode 306A and second electrode 308B may be joined. Second electrode 308B, e.g. Second electrode collector 308B$_C$, and third electrode 308C, e.g. third electrode collector 308C$_C$, may be joined as described with respect to various embodiments above, describing how first electrode 306A and second electrode 308B may be joined.

According to various embodiments, reaction chamber arrangement 600 may include a lead-acid battery system.

According to various embodiments, reaction chamber arrangement 600 may include but is not limited to a lithium-ion battery system as one possible example. According to various embodiments, reaction chamber arrangement 600 may include but is not limited to Alkaline-manganese battery; Nickel-Oxyhydroxide-battery, Zinc-Air-battery; Silver oxide-Zinc-battery; Natrium-Nickelchloride-battery (Zebra-Battery).

Figure 7:
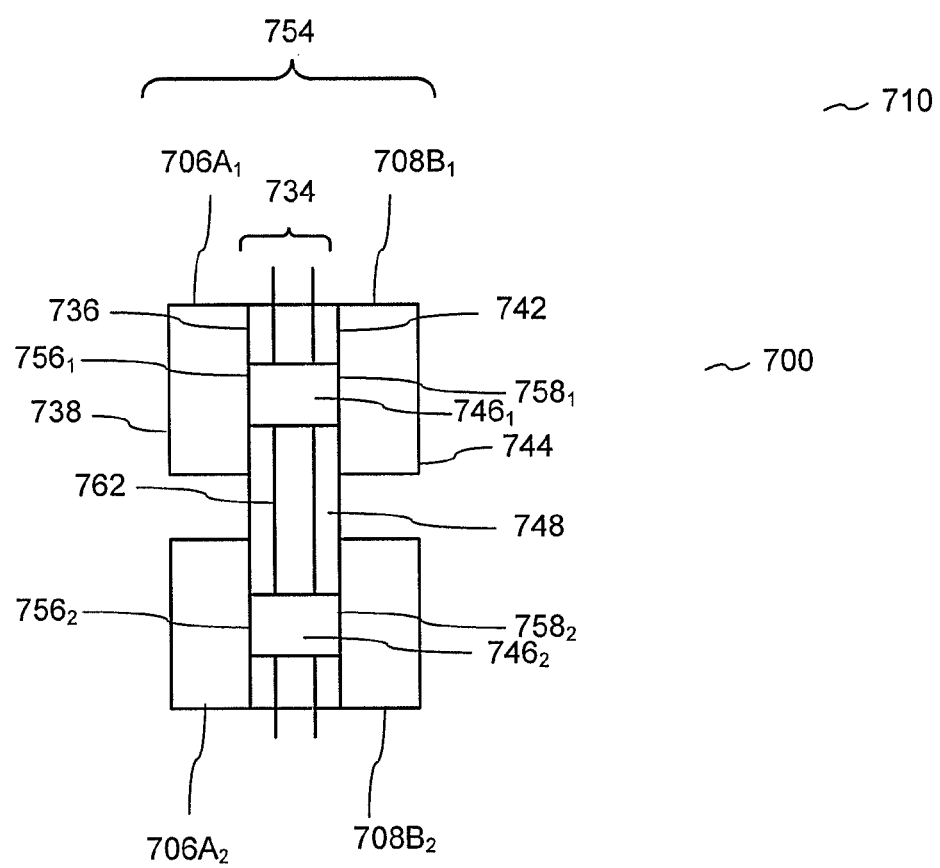
FIG. 7 shows a reaction chamber arrangement according to an embodiment.

FIG. 7 shows a reaction chamber arrangement 700 according to an embodiment. Reaction chamber arrangement 700 may include all the features described with respect to reaction chamber arrangement 500 and reaction chamber arrangement 600, except that first electrode 306A may be modified to first electrode 706A and second electrode 308B may be modified to second electrode 708B. First electrode 706A may include all the features and functionalities described with respect to first electrode 306A except that first electrode 706A may be split into two or more parts. By way of example, first electrode 706A may be split into two parts. Therefore, first electrode 706A may include first electrode first region 706A$_1$ and first electrode second region 706A$_2$.

First electrode first region 706A$_1$ and first electrode second region 706A$_2$ may each include all the features and functionalities already described with respect to first electrode 306A. Each of first electrode first region 706A$_1$ and first electrode second region 706A$_2$ may be configured to carry out all the functions described with respect to first electrode 306A.

Second electrode 708B may include all the features and functionalities described with respect to second electrode 308B except that second electrode 708B may be split into two or more parts. By way of example, first electrode 706A may be split into two parts. Therefore, second electrode 708B may include second electrode first region 708B$_1$ and second electrode second region 708B$_2$.

Second electrode first region 708B$_1$ and second electrode second region 708B$_2$ may each include all the features and functionalities already described with respect to second electrode 308B. Each of second electrode first region $708B_1$ and second electrode second region $708B_2$ may be configured to carry out all the functions described with second electrode 308B.

First electrode first region $706A_1$ may be configured to influence a part, e.g. an upper region, of first chemical reaction chamber 318A. First electrode second region $706A_2$ may be configured to influence another part, e.g. a lower region, of first chemical reaction chamber 318A.

Second electrode first region $708B_1$ may be configured to influence a part, e.g. an upper region, of second chemical reaction chamber 318B. Second electrode second region $708B_2$ may be configured to influence another part, e.g. a lower region of second chemical reaction chamber 318B.

First electrode first region $706A_1$ and second electrode first region $708B_1$ may be electrically coupled through isolation member 734 to allow a charge carrier flow between first electrode first region $706A_1$ and second electrode first region $708B_1$ during a chemical reaction in a region of at least one of first chemical reaction chamber 318A and second chemical reaction chamber 318B, e.g. during a chemical reaction in an upper portion of first chemical reaction chamber 318A chamber and an upper portion of second chemical reaction chamber 318B.

First electrode first region $706A_1$ and second electrode first region $708B_1$ may be electrically coupled via electronic component $746_1$ through isolation member 734 to allow a charge carrier flow between first electrode first region $706A_1$ and second electrode first region $708B_1$. Electronic component $746_1$ may be electrically connected to first electrode first region $706A_1$ via an electrical contact $756_1$. Electronic component $746_1$ may be electrically connected to second electrode first region $708B_1$ via another electrical contact $758_1$.

First electrode first region $706A_1$ and second electrode first region $708B_1$ may be adhered to isolating member 734. Electronic component $746_1$ may be adhered between first electrode first region $706A_1$ and second electrode first region $708B_1$ in isolating member 734. First electrode first region $706A_1$ may be electrically connected to second electrode first region $708B_1$ through electronic component 746 embedded in isolating member 734.

First electrode second region $706A_2$ and second electrode second region $708B_2$ may be electrically coupled through isolation member 734 to allow a charge carrier flow between first electrode second region $706A_2$ and second electrode second region $708B_2$ during a chemical reaction in another region of at least one of first chemical reaction chamber 318A chamber and second chemical reaction chamber 318B, e.g. during a chemical reaction in a lower portion of first chemical reaction chamber 318A chamber and a lower portion of second chemical reaction chamber 318B.

First electrode second region $706A_2$ and second electrode second region $708B_2$ may be electrically coupled via electronic component $746_2$ through isolation member 734 to allow a charge carrier flow between first electrode second region $706A_2$ and second electrode second region $708B_2$. Electronic component $746_2$ may be electrically connected to first electrode second region $706A_2$ via an electrical contact $756_2$. Electronic component $746_2$ may be electrically connected to second electrode second region $708B_2$ via another electrical contact $758_2$.

First electrode second region $706A_2$ and second electrode second region $708B_2$ may be adhered to isolating member 734. Electronic component $746_2$ may be adhered between first electrode second region $706A_2$ and second electrode second region $708B_2$ in isolating member 734. First electrode second region $706A_2$ may be electrically connected to second electrode second region $708B_2$ through electronic component $746_2$ embedded in isolating member 734.

First electrode first region $706A_1$ and first electrode second region $706A_2$ may be mounted on a first side 736 of isolation member 734. Second electrode first region $708B_1$ and second electrode second region $708B_2$ may be mounted on a second side 742 of isolation member 734, wherein first side 746 of isolation member 734 faces an opposite direction to the direction faced by second side 742 of isolation member 734.

Isolation member 534 may be modified to isolation member 734. Isolation member may include one or more electronic components $746_1$, $746_2$, wherein one or more electronic components $746_1$, $746_2$ may be arranged between and connected to first electrode 706A and second electrode 708B. Each of one or more electronic components $746_1$, $746_2$ may be at least partially surrounded by isolation material 748 of isolation member 734.

Isolation material 748 of isolation member 734 may include all the functionalities described with respect to isolation material 548 of isolation member 534.

Isolation member 734 may include all the functionalities described with respect to isolation member 534.

Electrical contacts $756_1$, $756_2$ may include all the functionalities described with respect electrical contact 656.

Electrical contacts $758_1$, $758_2$ may include all the functionalities described with respect electrical contact 658.

One or more electronic components $746_1$, $746_2$ may include all the functionalities described with respect to electronic component $746_1$.

One or more electronic components $746_1$, $746_2$ may be configured to measure or control a region of first chemical reaction chamber 318A independently from at least a further region of first chemical reaction chamber 318A.

According to various embodiments, electronic component 546 may include a plurality of electronic components $746_1$, $746_2$, $746_3$, $746_4$ etc. Each of the plurality of electronic components $746_1$, $746_2$, $746_3$, $746_4$ may be configured to measure or control different specified regions of at least one of first chemical reaction chamber 318A and second chemical reaction chamber 318B, independently from each other.

One or more electronic components $746_1$, $746_2$ may include one or more input/output connections 762. For example, one or more input signals may be received by one or more electronic components $746_1$, $746_2$ via input/output connection 762. The one or more input signals may include measurement signals obtained from at least one of a first region of first chemical reaction chamber 318A, a second region of first chemical reaction chamber 318A, a first region of second chemical reaction chamber 318B, and a second region of second chemical reaction chamber 318B.

One or more output signals may be transmitted by one or more electronic components $746_1$, $746_2$ by via input/output connection 762. One or more electronic components $746_1$, $746_2$ may be electrically connected to one or more other microcontrollers. Electronic component $746_1$ embedded between first electrode first region $706A_1$ and first electrode second region $706A_2$ may be electrically connected with electronic component $746_2$ embedded between second electrode first region $708B_1$ and second electrode second region $708B_2$. In other words, electronic component $746_1$ which may be configured to monitor or control a predetermined region of a predetermined group of reaction cells may be electrically connected with electronic component $746_2$ which may be configured to monitor or control a further predetermined region of the predetermined group of reaction cells, wherein the predetermined group of reaction cells form part of reaction chamber arrangement 700. Furthermore, predetermined region of the predetermined group of reaction cells may not be monitored or controlled by electronic component $746_2$, and further predetermined region of the predetermined group of reaction cells may not be monitored or controlled by electronic component $746_1$.

FIG. 8 shows a method 800 for forming a reaction chamber arrangement according to an embodiment. The method includes:

forming a first chemical reaction chamber (in 810);
forming a second chemical reaction chamber (in 820);
forming an isolation member between the first chemical reaction chamber and the second chemical reaction chamber, mounting a first electrode on a first side of the isolation member, wherein an exposed surface of the first electrode faces into the first chemical reaction chamber, mounting a second electrode on a second side of the isolation member, wherein an exposed surface of the second electrode faces into the second chemical reaction chamber (in 830);
configuring an electronic component to measure or control at least one of the first chemical reaction chamber and the second chemical reaction chamber (in 840);
arranging the electronic component between and connecting the electronic component to the first electrode and the second electrode (in 850), and
at least partially surrounding the electronic component by an isolation material of the isolation member (in 860).

Various embodiments provide an integrated electrode system for new safe and durable batteries. The electrodes may not only be arranged from a single metal, but through a system including different metallic areas, isolation and integrated circuits which performs measurement and regular functions.

Various embodiments provide a sensor arrangement which allows to make current intelligent, e.g. a digital signal may be placed on a battery current to give info about a payment status.

Various embodiments provide a sensor arrangement including one or more semiconductor devices, integrated into an electrochemical electrode system, wherein the electrochemical electrode system, may include same or different electrode materials and one or more isolation materials.

Various embodiments provide a reaction chamber arrangement, including a first chemical reaction chamber; a second chemical reaction chamber; an isolation member between the first chemical reaction chamber and the second chemical reaction chamber, wherein a first electrode is mounted on a first side of the isolation member, an exposed surface of the first electrode facing into the first chemical reaction chamber and wherein a second electrode is mounted on a second side of the isolation member, an exposed surface of the second electrode facing into the second chemical reaction chamber; and an electronic component configured to measure or control at least one of the first chemical reaction chamber and the second chemical reaction chamber, wherein the electronic component is arranged between and connected to the first electrode and the second electrode, and at least partially surrounded by an isolation material of the isolation member.

According to an embodiment, the first electrode and the second electrode are electrically coupled through the isolation member to allow a charge carrier flow between the first electrode and the second electrode during a chemical reaction in the first chemical reaction chamber and the second chemical reaction chamber.

According to an embodiment, the electronic component is configured to control a flow of charge carriers in at least one of the first electrode and the second electrode to generate a chemical reaction within at least one of the first chemical reaction chamber and the second chemical reaction chamber.

According to an embodiment, the reaction chamber arrangement further includes a first further electrode, wherein the first chemical reaction chamber is electrically coupled between the first electrode and the first further electrode; and wherein an exposed surface of the first further electrode faces into the first chemical reaction chamber; and a second further electrode, wherein the second chemical reaction chamber is electrically coupled between the second electrode and the second further electrode; and wherein an exposed surface of the second further electrode faces into the second chemical reaction chamber.

According to an embodiment, the reaction chamber arrangement further includes a first isolated carrier and a second isolated carrier; wherein the first chemical reaction chamber and the first electrode are formed over the first isolated carrier; and wherein the second chemical reaction chamber and the second electrode are formed over the second isolated carrier; wherein the first isolated carrier is joined to the second isolated carrier by means of the isolation member joining the first electrode and the second electrode.

According to an embodiment, the reaction chamber arrangement further includes a photovoltaic cell arrangement, wherein at least one of the first chemical reaction chamber and the second chemical reaction chamber includes a photovoltaic material configured to generate a flow of charge carriers in at least one of the first electrode and the second electrode in response to a photo-induced chemical reaction in the photovoltaic material.

According to an embodiment, the reaction chamber arrangement further includes a battery cell arrangement, wherein at least one of the first chemical reaction chamber and the second chemical reaction chamber includes an electrolyte configured to generate a flow of charge carriers in at least one of the first electrode and the second electrode in response to a movement of ions in the electrolyte between the first electrode and the second electrode.

According to an embodiment, the reaction chamber arrangement further includes a sensor arrangement, wherein at least one of the first chemical reaction chamber and the second chemical reaction chamber includes a sensing area configured to generate a flow of charge carriers in at least one of the first electrode and the second electrode in response to a signal received by the sensing area.

According to an embodiment, the reaction chamber arrangement includes at least one sensor.

According to an embodiment, the at least one sensor includes at least one sensor from at least one from the following group of sensors, the group consisting of: a chemical sensor; a biological sensor; a biochemical sensor; a pressure sensor; and a temperature sensor.

According to an embodiment, the first electrode and the second electrode are adhered to the isolating member.

According to an embodiment, the electronic component is adhered between the first electrode and the second electrode in the isolating member.

According to an embodiment, the first electrode is electrically connected to the second electrode through the electronic component embedded in the isolating member.

According to an embodiment, the electronic component is configured to measure or control one or more signals associated with a flow of charge carriers between the first electrode and the second electrode.

According to an embodiment, the electronic component is configured to measure or control at least one signal from the following group of signals of at least one of the first chemical reaction chamber and the second chemical reaction chamber, the group of signals consisting of: current flow, charge concentration, charge homogeneity, current homogeneity, voltage, temperature.

According to an embodiment, the electronic component is configured to identify at least one of the first chemical reaction chamber and the second chemical reaction chamber.

According to an embodiment, the electronic component is configured to measure or control the first chemical reaction chamber independently from the second chemical reaction chamber.

According to an embodiment, the electronic component is configured to provide feedback between the first chemical reaction chamber and the second chemical reaction chamber, wherein behavior of the first chemical reaction chamber and the second chemical reaction chamber are interdependent.

According to an embodiment, the electronic component is configured to measure or control a region of the first chemical reaction chamber independently from at least a further region of the first chemical reaction chamber.

According to an embodiment, the first electrode and the second electrode each includes at least one from the following group of materials, the group consisting of: Cu, Al, Sn, Zn, Au, Pt, Pd, Ag, Hg, W, Cr, Mn, Pb, C, carbon, metals or metal alloys.

According to an embodiment, isolating member includes an electrically insulating material.

According to an embodiment, the isolating member includes at least one from the following group of materials, the group consisting of: an epoxy, a polymer, a laminate, a plastic, a thermoplastic, a foil, a thermoplastic pressed foil.

According to an embodiment, the isolating member includes a thickness in the range from about 100 µm to about 300 µm.

According to an embodiment, the first electrode is electrically connected to a first terminal of a power supply via the first reaction chamber, and wherein the second electrode is electrically connected to a second terminal of the power supply through the second reaction chamber.

According to an embodiment, the reaction chamber arrangement further includes a third chemical reaction chamber; a further isolation member between the second chemical reaction chamber and the third chemical reaction chamber, wherein the second further electrode is mounted on a first side of the further isolation member, the exposed surface of the second further electrode facing into the second chemical reaction chamber and wherein a third electrode is mounted on a second side of the further isolation member, an exposed surface of the third electrode facing the third chemical reaction chamber; and a further electronic component configured to measure or control at least one of the second chemical reaction chamber and the third chemical reaction chamber, wherein the electronic component is arranged between and connected to the second further electrode and the third electrode, and at least partially surrounded by a further isolation material of the further isolation member.

A method for forming a reaction chamber arrangement is provided according to an embodiment, the method including: forming a first chemical reaction chamber; forming a second chemical reaction chamber; forming an isolation member between the first chemical reaction chamber and the second chemical reaction chamber, mounting a first electrode on a first side of the isolation member, wherein an exposed surface of the first electrode faces into the first chemical reaction chamber, mounting a second electrode on a second side of the isolation member, wherein an exposed surface of the second electrode faces into the second chemical reaction chamber; configuring an electronic component to measure or control at least one of the first chemical reaction chamber and the second chemical reaction chamber; arranging the electronic component between and connecting the electronic component to the first electrode and the second electrode, and at least partially surrounding the electronic component by an isolation material of the isolation member.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A reaction chamber arrangement, comprising:
a first chemical reaction chamber;
a second chemical reaction chamber;
an isolation member between the first chemical reaction chamber and the second chemical reaction chamber, wherein a first electrode is mounted on a first side of the isolation member, an exposed surface of the first electrode facing into the first chemical reaction chamber and wherein a second electrode is mounted on a second side of the isolation member, an exposed surface of the second electrode facing into the second chemical reaction chamber; and
an electronic component configured to measure or control at least one of the first chemical reaction chamber and the second chemical reaction chamber, wherein the electronic component is arranged between and connected to the first electrode and the second electrode, and at least partially surrounded by an isolation material of the isolation member.

2. The reaction chamber arrangement according to claim 1, wherein the first electrode and the second electrode are electrically coupled through the isolation member to allow a charge carrier flow between the first electrode and the second electrode during a chemical reaction in the first chemical reaction chamber and the second chemical reaction chamber.

3. The reaction chamber arrangement according to claim 1, wherein the electronic component is configured to control a flow of charge carriers in at least one of the first electrode and the second electrode to generate a chemical reaction within at least one of the first chemical reaction chamber and the second chemical reaction chamber.

4. The reaction chamber arrangement according to claim 1, further comprising
a first further electrode, wherein the first chemical reaction chamber is electrically coupled between the first electrode and the first further electrode; and wherein an exposed surface of the first further electrode faces into the first chemical reaction chamber; and
a second further electrode, wherein the second chemical reaction chamber is electrically coupled between the second electrode and the second further electrode; and wherein an exposed surface of the second further electrode faces into the second chemical reaction chamber.

5. The reaction chamber arrangement according to claim 1, further comprising:
a first isolated carrier and a second isolated carrier;
wherein the first chemical reaction chamber and the first electrode are formed over the first isolated carrier; and wherein the second chemical reaction chamber and the second electrode are formed over the second isolated carrier;
wherein the first isolated carrier is joined to the second isolated carrier by means of the isolation member joining the first electrode and the second electrode.

6. The reaction chamber arrangement according to claim 1, further comprising:
a photovoltaic cell arrangement,
wherein at least one of the first chemical reaction chamber and the second chemical reaction chamber comprises a photovoltaic material configured to generate a flow of charge carriers in at least one of the first electrode and the second electrode in response to a photo-induced chemical reaction in the photovoltaic material.

7. The reaction chamber arrangement according to claim 1, further comprising:
a battery cell arrangement,
wherein at least one of the first chemical reaction chamber and the second chemical reaction chamber comprises an electrolyte configured to generate a flow of charge carriers in at least one of the first electrode and the second electrode in response to a movement of ions in the electrolyte between the first electrode and the second electrode.

8. The reaction chamber arrangement according to claim 1, further comprising:
a sensor arrangement,
wherein at least one of the first chemical reaction chamber and the second chemical reaction chamber comprises a sensing area configured to generate a flow of charge carriers in at least one of the first electrode and the second electrode in response to a signal received by the sensing area.

9. The reaction chamber arrangement according to claim 1, wherein the reaction chamber arrangement comprises at least one sensor.

10. The reaction chamber arrangement according to claim 9, wherein the at least one sensor comprises at least one sensor from at least one from the following group of sensors, the group consisting of:
a chemical sensor;
a biological sensor;
a biochemical sensor;
a pressure sensor; and
a temperature sensor.

11. The reaction chamber arrangement according to claim 1, wherein the first electrode and the second electrode are adhered to the isolating member.

12. The reaction chamber arrangement according to claim 1, wherein the electronic component is adhered between the first electrode and the second electrode in the isolating member.

13. The reaction chamber arrangement according to claim 1, wherein the first electrode is electrically connected to the second electrode through the electronic component embedded in the isolating member.

14. The reaction chamber arrangement according to claim 1, wherein the electronic component is configured to measure or control one or more signals associated with a flow of charge carriers between the first electrode and the second electrode.

15. The reaction chamber arrangement according to claim 1, wherein the electronic component is configured to measure or control at least one signal from the following group of signals of at least one of the first chemical reaction chamber and the second chemical reaction chamber, the group of signals consisting of: current flow, charge concentration, charge homogeneity, current homogeneity, voltage, temperature.

16. The reaction chamber arrangement according to claim 1, wherein the electronic component is configured to identify at least one of the first chemical reaction chamber and the second chemical reaction chamber.

17. The reaction chamber arrangement according to claim 1, wherein the electronic component is configured to measure or control the first chemical reaction chamber independently from the second chemical reaction chamber.

18. The reaction chamber arrangement according to claim 1, wherein the electronic component is configured to provide feedback between the first chemical reaction chamber and the second chemical reaction chamber,
wherein behavior of the first chemical reaction chamber and the second chemical reaction chamber are interdependent.

19. The reaction chamber arrangement according to claim 1, wherein the electronic component is configured to measure or control a region of the first chemical reaction chamber independently from at least a further region of the first chemical reaction chamber.

20. The reaction chamber arrangement according to claim 1, wherein the first electrode and the second electrode each comprises at least one from the following group of materials, the group consisting of: Cu, Al, Sn, Zn, Au, Pt, Pd, Ag, Hg, W, Cr, Mn, Pb, C, carbon, metals or metal alloys.

21. The reaction chamber arrangement according to claim 1, wherein the isolating member comprises an electrically insulating material.

22. The reaction chamber arrangement according to claim 21, wherein the isolating member comprises at least one from the following group of materials, the group consisting of: an epoxy, a polymer, a laminate, a plastic, a thermoplastic, a foil, a thermoplastic pressed foil.

23. The reaction chamber arrangement according to claim 1, wherein the isolating member comprises a thickness in the range from about 100 μm to about 300 μm.

24. The reaction chamber arrangement according to claim 1, wherein the first electrode is electrically connected to a first terminal of a power supply via the first reaction chamber, and wherein the second electrode is electrically connected to a second terminal of the power supply through the second reaction chamber.

25. The reaction chamber arrangement according to claim 4, further comprising
a third chemical reaction chamber;
a further isolation member between the second chemical reaction chamber and the third chemical reaction chamber, wherein the second further electrode is mounted on a first side of the further isolation member, the exposed surface of the second further electrode facing into the second chemical reaction chamber and wherein a third electrode is mounted on a second side of the further isolation member, an exposed surface of the third electrode facing the third chemical reaction chamber; and a further electronic component configured to measure or control at least one of the second chemical reaction chamber and the third chemical reaction chamber, wherein the electronic component is arranged between and connected to the second further electrode and the third electrode, and at least partially surrounded by a further isolation material of the further isolation member.

26. A method for forming a reaction chamber arrangement, the method comprising:

forming a first chemical reaction chamber;

forming a second chemical reaction chamber;

forming an isolation member between the first chemical reaction chamber and the second chemical reaction chamber, mounting a first electrode on a first side of the isolation member, wherein an exposed surface of the first electrode faces into the first chemical reaction chamber, mounting a second electrode on a second side of the isolation member, wherein an exposed surface of the second electrode faces into the second chemical reaction chamber;

configuring an electronic component to measure or control at least one of the first chemical reaction chamber and the second chemical reaction chamber;

arranging the electronic component between and connecting the electronic component to the first electrode and the second electrode, and at least partially surrounding the electronic component by an isolation material of the isolation member.

* * * * *